No. 742,966.

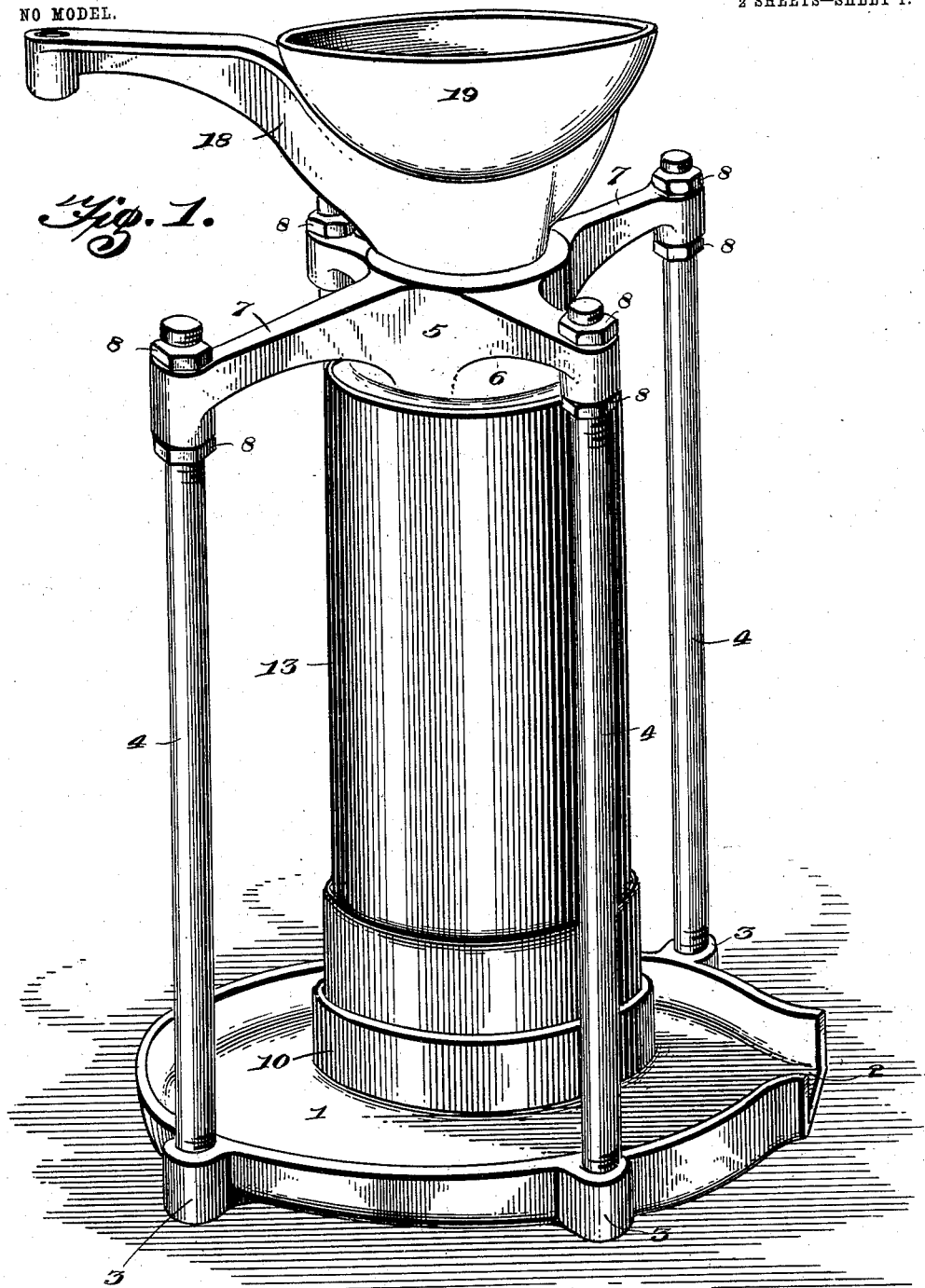

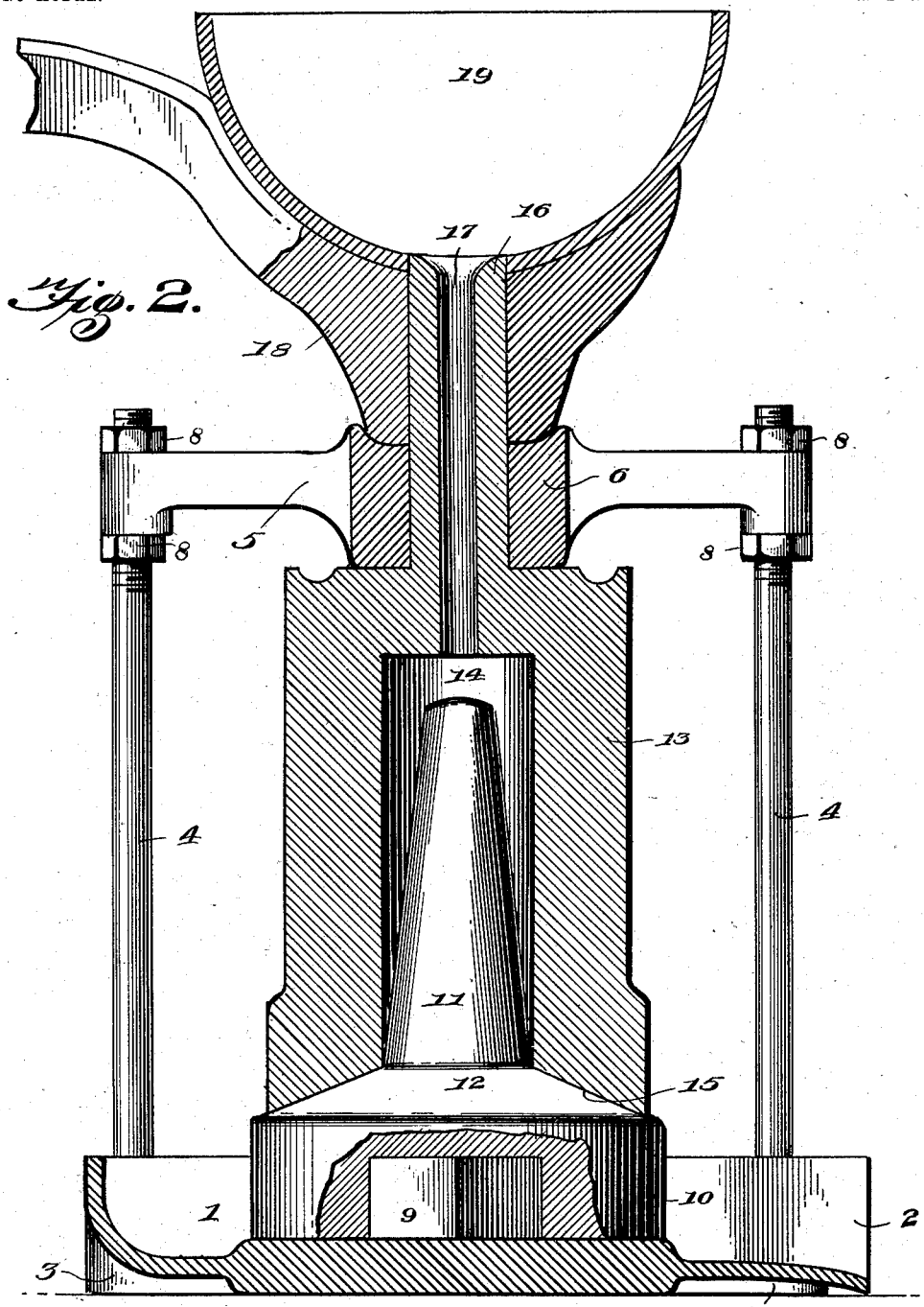

Patented November 3, 1903.

UNITED STATES PATENT OFFICE.

JOHN Y. BYERS, OF DESCANSO, CALIFORNIA, ASSIGNOR OF ONE-HALF TO JOHN F. FORWARD, OF DESCANSO, CALIFORNIA.

QUARTZ-MILL.

SPECIFICATION forming part of Letters Patent No. 742,966, dated November 3, 1903.

Application filed March 28, 1901. Serial No. 53,303. (No model.)

*To all whom it may concern:*

Be it known that I, JOHN Y. BYERS, a citizen of the United States, residing at Descanso, in the county of San Diego and State of California, have invented a new and useful Quartz-Mill, of which the following is a specification.

My invention is an improved quartz-mill; and it consists in the peculiar construction and combination of devices hereinafter fully set forth and claimed.

In the accompanying drawings, Figure 1 is a perspective view of a quartz-mill constructed in accordance with my invention. Fig. 2 is a vertical sectional view of the same.

In the embodiment of my invention here shown the base 1 forms a circular trough provided at one side with a discharge-spout 2 and provided at suitable points on its outer side with lugs 3, in which are secured the lower ends of vertical columns 4. The latter support an adjustable upper plate or spider 5, the same in the form of my invention here shown comprising a central hub 6 and radial arms 7. The latter have openings in their outer ends through which the upper portions of the columns 4 extend, the plate or spider being vertically movable on said columns and the latter being screw-threaded and provided with adjusting-nuts 8, which engage, support, and secure the arms of the plate or spider and by means of which the latter may be adjusted as may be required.

The base 1 is provided on its upper side at its center with an integral fixed angular projection 9. On the same is secured the base 10 of a grinding-cone 11, the base 10 of said grinding-cone having an opening in its lower side which receives the said angular projection 9, the said opening corresponding in shape with the said projection, and hence the grinding-cone, while being readily detachable from the base by merely lifting the same therefrom, is prevented from rotating on the base, as will be understood. Above the base 10 and between the same and the grinding-cone 11 is a pulverizing-surface 12, which is disposed at an angle to the cone 11 and is a conic frustum, the sides of which are more nearly horizontal than those of the cone 11.

A revoluble grinding-cylinder 13 has the cylindrical bore 14, in which the cone 11 is disposed, the diameter of said cylindrical bore being equal to or slightly in excess of the diameter of the base of the cone 11. Hence the space between the sides of the said cone 11 and the said cylindrical bore of the revoluble grinding-cylinder converges downward, as is shown in Fig. 2. The lower side of the revoluble grinding-cylinder is adapted to fit snugly on the grinding-surface 12 of the cone, as at 15. Formed integrally with the grinding-cylinder at the upper end thereof is a feed-shaft 16, which is a tube, the bore 17 thereof leading to the upper portion of the cylindrical bore 14 of the cylinder at a point above the cone 11. The said feed-shaft instead of being formed integrally with the grinding-cylinder may be formed separately therefrom and secured thereto, so that the said shaft and cylinder will rotate in unison. The said feed-shaft is journaled in a bearing formed by the hub 6 of the plate or spider 5.

In the form of my invention here shown a handle or sweep 18 is attached to the upper portion of the feed-shaft 16 and is fast thereto, so that the said feed-shaft, together with the grinding-cylinder 13, may be revolved by power applied to said handle or sweep. Any other means, however, may within the scope of my invention be employed for rotating the cylinder 13, and I do not limit myself in this particular.

In the form of my invention here shown a hopper 19 is secured to the upper end of the feed-shaft and supported on the arm or sweep 18. The quartz to be ground is placed in this hopper and is fed from the same by the feed-shaft to the coacting cylindrical bore of the revoluble grinding-cylinder and the cone 11, as will be understood. I do not, however, limit myself to this construction, as the hopper may be dispensed with and some other suitable means employed in lieu thereof for feeding the material to the feed-shaft 16.

In the operation of my invention the quartz, together with a stream of water from a suitable source, is fed through the revoluble feed-tube into the bore 14 of the revoluble grinding-cylinder and is reduced to fine particles as it descends between the revoluble surface of the bore of the cylinder and the surface of the stationary cone 11, as will be understood. As the particles descend below the base of the cone 11 they flow, together with the water, between the opposing conical faces 12 15 of the stationary cone and revoluble grinding-cylinder and by the attrition thereof are pulverized, the sludge being discharged into the circular trough formed in the base 1 and passing therefrom through the spout 2.

Having thus described my invention, I claim—

1. In a quartz-mill, the combination with a base having a non-circular projection, of a grinding member supported detachably upon said base and having its lower end expanded to form a pulverizing-surface and provided in its under side with a non-circular recess extending into the said expanded portion and adapted to engage the non-circular projection of the base to retain the grinding member fixedly in position upon the latter.

2. In a quartz-mill the combination of a base having an upwardly-extending non-circular projection, a grinding member having an expanded portion forming a pulverizing-surface and provided at its lower end with a non-circular recess to engage the non-circular projection upon the base and thereby prevent the rotation of said grinding member, a revoluble grinding member having a cylindrical bore and an inclined lower edge to receive the stationary grinding member and to engage the pulverizing-surface of the latter, said revoluble grinding member being provided with an upwardly-extending stem, bored to form a feed-channel, uprights rising from the base-frame, a spider mounted upon the feed-shaft and having arms engaging the said uprights, a sweep mounted fixedly upon the shaft above said spider, and adjusting-nuts on the uprights for effecting the vertical adjustment of the spider and the revoluble grinding member.

In testimony that I claim the foregoing as my own I have hereto affixed my signature in the presence of two witnesses.

JOHN Y. BYERS.

Witnesses:
S. S. KNOLES,
GEO. T. VERNON.